(12) United States Patent
Ward et al.

(10) Patent No.: US 12,140,152 B1
(45) Date of Patent: Nov. 12, 2024

(54) NOSE CONE/SPINNER POWER TAKEOFF

(71) Applicant: RTX Corporation, Farmington, CT (US)

(72) Inventors: Daniel A. Ward, Colebrook, CT (US); Joseph T. Christians, Vernon, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/239,857

(22) Filed: Aug. 30, 2023

(51) Int. Cl.
*F02C 7/32* (2006.01)
*F04D 29/32* (2006.01)

(52) U.S. Cl.
CPC .............. *F04D 29/329* (2013.01); *F02C 7/32* (2013.01); *F05D 2220/36* (2013.01)

(58) Field of Classification Search
CPC ...... F02C 7/00; F02C 7/04; F02C 7/32; F05D 2220/36; F04D 29/329; F01D 15/08; F01D 15/10
See application file for complete search history.

(56) References Cited

U.S. PATENT DOCUMENTS

| | | | |
|---|---|---|---|
| 7,303,377 B2 | 12/2007 | Rockarts et al. | |
| 10,583,913 B2 * | 3/2020 | Goverdhan | B64C 11/14 |
| 10,605,165 B2 * | 3/2020 | Abe | B64C 11/02 |
| 2014/0356134 A1 * | 12/2014 | Stoughton | F02C 7/04 |
| | | | 29/889.3 |
| 2019/0234242 A1 * | 8/2019 | Ramakrishnan | B64C 30/00 |
| 2020/0149400 A1 * | 5/2020 | Whithead | F01D 5/3092 |

* cited by examiner

*Primary Examiner* — David E Sosnowski
*Assistant Examiner* — Maxime M Adjagbe
(74) *Attorney, Agent, or Firm* — Bachman & LaPointe, P.C.

(57) ABSTRACT

A coupling for a fan hub including an auxiliary unit attached to the coupling; the fan hub attached to the coupling opposite the auxiliary unit, wherein the misalignment-tolerant coupling is configured to translate rotary motion along an axis from the fan hub to the auxiliary unit to provide rotational power from a gas turbine engine to the auxiliary unit.

14 Claims, 2 Drawing Sheets

NOSE CONE/SPINNER POWER TAKEOFF

BACKGROUND

The present disclosure is directed to a coupling for use on a fan rotor.

Certain aircraft lack sufficient electrical power to run current electronic systems, for example, for avionics systems. One solution for increasing the available power is to modify the Airframe Mounted Accessory Drive (AMAD) to provide more power and install a larger generator on the AMAD. Another solution is to modify the Engine Mounted Accessory Drive (EMAD). Usually these solutions are difficult to achieve for at least two reasons: (1) no empty volume exists within the aircraft for a larger generator and AMAD or EMAD to grow into, and (2) changing the AMAD or EMAD and generator is cost prohibitive. Other options, however, are typically less attractive or not feasible for various reasons. For instance, a pop-up air scoop could be deployed to drive a Ram Air Turbine (RAT) that would drive a generator. This solution, imposes additional aerodynamic drag on the aircraft. The additional aerodynamic drag could adversely affect aircraft performance. The additional RAT incurs a large amount of weight and mechanical complexity compared to the amount of extra power generated so that it is inefficient from both a cost and energy standpoint.

Gas turbine engines include a fan with a fan hub or rotor supporting fan blades. The forward portion of the fan hub can include a nose cone. In certain fan hub designs, the nose cone can be removeable. The removable nose cone can be fastened by a set of nose cone fasteners.

What is needed is an alternative source of auxiliary power for a gas turbine engine without the unwanted drawbacks of modification of an AMAD or EMAD.

SUMMARY

In accordance with the present disclosure, there is provided a coupling for a fan hub comprising an auxiliary unit attached to the coupling; the fan hub attached to the coupling opposite the auxiliary unit, wherein the coupling is configured to translate rotary motion along an axis from the fan hub to the auxiliary unit to provide rotational power from a gas turbine engine to the auxiliary unit.

A further embodiment of any of the foregoing embodiments may additionally and/or alternatively include the fan hub supports fan blades.

A further embodiment of any of the foregoing embodiments may additionally and/or alternatively include the auxiliary unit is selected from the group consisting of an electrical generator, a hydraulic pump and an airframe mounted accessory drive.

A further embodiment of any of the foregoing embodiments may additionally and/or alternatively include the coupling comprises a drive adapter having a coupling bolt pattern for attaching to the fan hub.

A further embodiment of any of the foregoing embodiments may additionally and/or alternatively include the coupling comprises a flexible member attached to the drive adapter.

A further embodiment of any of the foregoing embodiments may additionally and/or alternatively include the flexible member comprises laminated sheets located on opposite sides of a central shaft.

A further embodiment of any of the foregoing embodiments may additionally and/or alternatively include the coupling comprises a bearing system attached to the flexible member opposite the drive adapter.

In accordance with the present disclosure, there is provided a gas turbine engine coupling for a fan hub power takeoff comprising a fan located at a forward portion of the gas turbine engine, the fan comprising the fan hub supporting fan blades; a casing attached forward of the fan proximate the forward portion of the gas turbine engine; an auxiliary unit mounted in the casing; a coupling operatively coupled between the fan hub and the auxiliary unit, wherein the coupling is configured to translate rotary motion along an axis from the fan hub to the auxiliary unit to provide rotational power from the gas turbine engine to the auxiliary unit.

A further embodiment of any of the foregoing embodiments may additionally and/or alternatively include the coupling comprises a drive adapter having a coupling bolt pattern for attaching to a fan hub flange bolt pattern to secure the drive adapter to the fan hub.

A further embodiment of any of the foregoing embodiments may additionally and/or alternatively include the coupling comprises a flexible member attached to the drive adapter configured to dampen misalignment between the fan hub and the auxiliary unit.

A further embodiment of any of the foregoing embodiments may additionally and/or alternatively include the flexible member comprises laminated sheets located on opposite sides of a central shaft.

A further embodiment of any of the foregoing embodiments may additionally and/or alternatively include the coupling comprises a bearing system attached to the flexible member opposite the drive adapter, the bearing system comprising a duplex bearing.

A further embodiment of any of the foregoing embodiments may additionally and/or alternatively include the coupling comprises a spline interface mounted between the duplex bearing and a drive shaft of the auxiliary unit.

In accordance with the present disclosure, there is provided a process for employing a gas turbine engine coupling for a fan hub power takeoff comprising locating a fan at a forward portion of the gas turbine engine, the fan comprising the fan hub supporting fan blades; attaching a casing forward of the fan proximate the forward portion of the gas turbine engine; mounting an auxiliary unit in the casing; attaching a coupling between the fan hub and the auxiliary unit; and translating rotary motion along an axis from the fan hub to the auxiliary unit to provide rotational power from the gas turbine engine to the auxiliary unit.

A further embodiment of any of the foregoing embodiments may additionally and/or alternatively include the process further comprising attaching the coupling to the fan hub employing a drive adapter having a coupling bolt pattern configured to match a bolt pattern of a fan hub flange bolt pattern to secure the drive adapter to the fan hub.

A further embodiment of any of the foregoing embodiments may additionally and/or alternatively include the process further comprising attaching a flexible member to the drive adapter; dampening misalignment between the fan hub and the auxiliary unit employing the flexible member.

A further embodiment of any of the foregoing embodiments may additionally and/or alternatively include the process further comprising attaching a bearing system to the flexible member opposite the drive adapter, the bearing system comprising a duplex bearing; and dampening rotational whirl with the duplex bearing.

A further embodiment of any of the foregoing embodiments may additionally and/or alternatively include the process further comprising mounting a spline interface between the duplex bearing and a drive shaft of the auxiliary unit.

A further embodiment of any of the foregoing embodiments may additionally and/or alternatively include the process further comprising supporting the bearing system with a bearing support attached to a centerbody of the casing.

A further embodiment of any of the foregoing embodiments may additionally and/or alternatively include the auxiliary unit is selected from the group consisting of an electrical generator, a hydraulic pump and an airframe mounted accessory drive.

Other details of the coupling for a fan hub are set forth in the following detailed description and the accompanying drawings wherein like reference numerals depict like elements.

DETAILED DESCRIPTION

Figure 1:
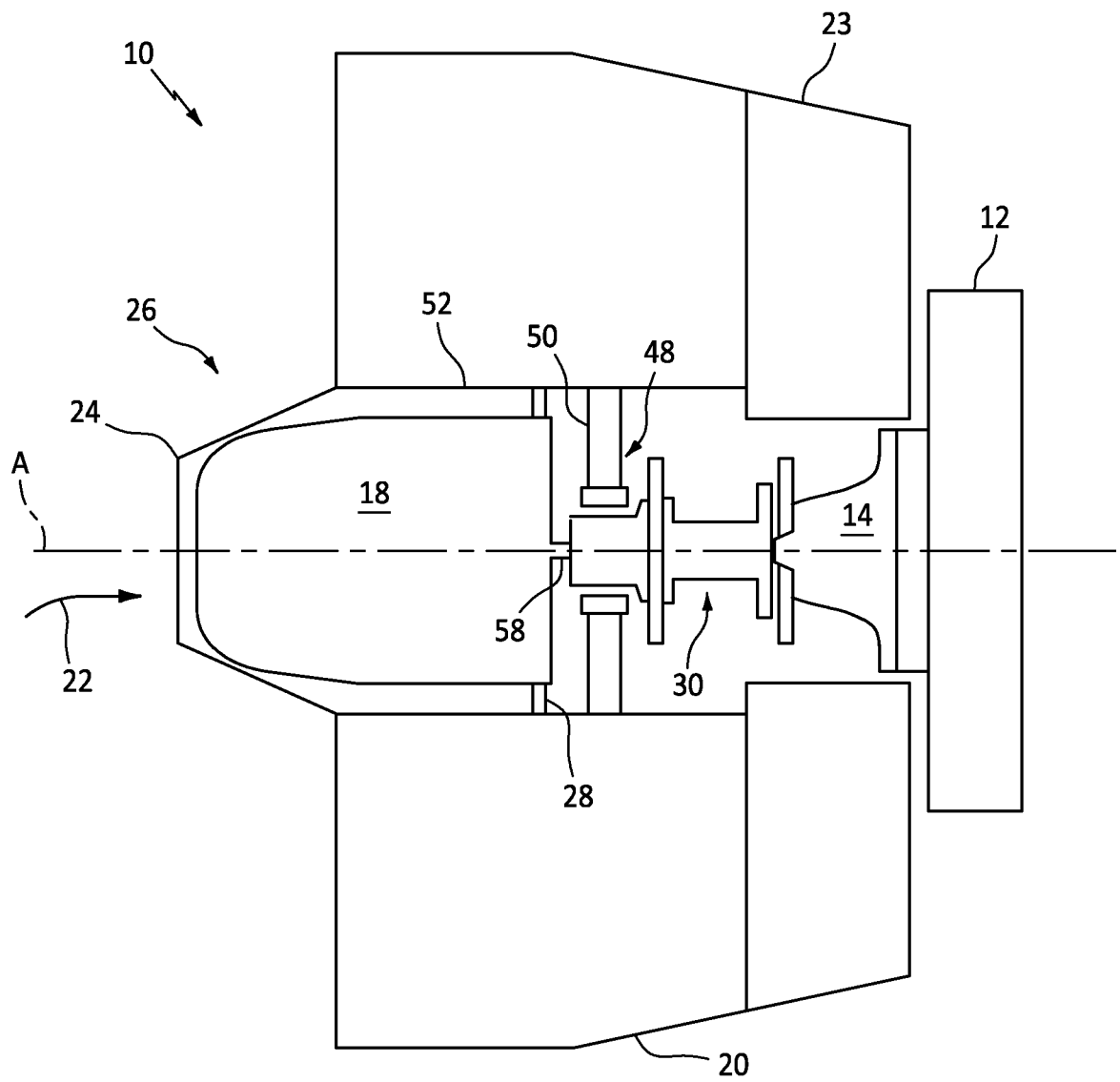
FIG. 1 is a schematic representation of a gas turbine engine forward portion.
Figure 2:
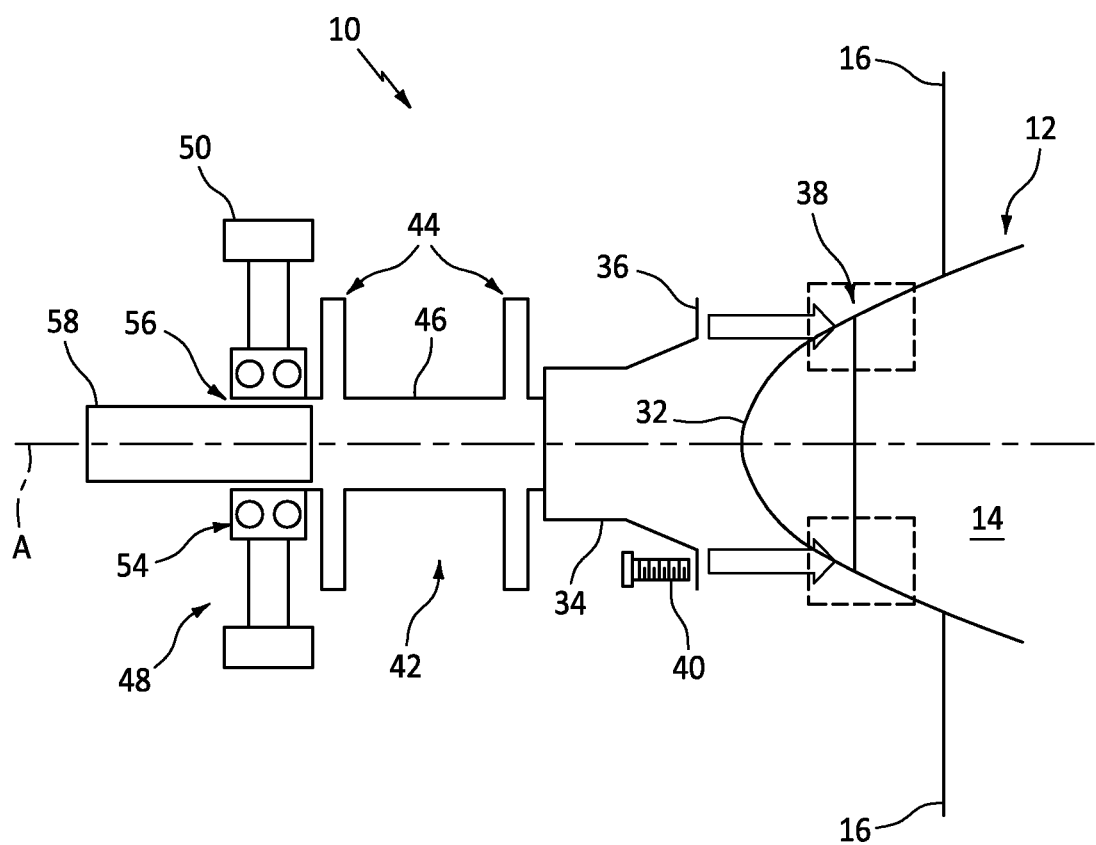
FIG. 2 is a schematic representation of an exemplary coupling for a fan hub.

Referring now to FIG. 1 and FIG. 2, there is illustrated a forward portion of a gas turbine engine 10. The gas turbine engine 10 includes a fan 12. The fan 12 includes a fan hub 14 supporting fan blades 16.

The gas turbine engine 10 includes an auxiliary unit 18. The auxiliary unit 18 can be an electrical generator or a hydraulic pump or other form of airframe or engine mounted accessory. The auxiliary unit 18 can be housed within a case 20. The case 20 provides structural support via support 23 to the auxiliary unit 18 as well as aerodynamic function for managing air flow 22 through the auxiliary unit 18 and fan 12. A nose cone 24 is mounted on a case forward portion 26 of the case 20. The nose cone 24 can manage the air flow 22 into or around the auxiliary unit 18. A mount ring 28 can be employed to secure the auxiliary unit 18 to the case 20.

A coupling 30 can operably couple the fan hub 14 and the auxiliary unit 18 so that rotary motion can be translated along Axis A from the fan hub 14 to the auxiliary unit 18 to provide rotational power from the gas turbine engine 10 to the auxiliary unit 18.

As seen in FIG. 2, a removeable fan spinner/nose cone 32 can be replaced to allow for the coupling 30 to attach with the fan hub 14. The coupling 30 can include a drive adapter 34. The drive adapter 34 includes a coupling bolt pattern 36 that matches a fan hub flange 38 bolt pattern to secure the drive adapter 34 to the fan hub 14. The fan nose cone 32 can be removed to provide an interface for the coupling 30. The fan nose cone 32 is attached to the fan hub flange 38. Spinner bolts 40 can be removed from the fan hub flange 38. The fan nose cone 32 can be removed from the fan hub flange 38. The drive adaptor 34 can be bolted to the fan hub flange 38 to secure the coupling 30 to the fan hub 14.

The coupling 30 includes a flexible member 42 attached to the drive adapter 34. The flexible member 42 is configured to dampen misalignment between the fan hub 14 and the auxiliary unit 18. The flexible member 42 can include laminated sheets 44 located on opposite sides of a central shaft 46. In an exemplary embodiment, the laminated sheets 44 can be constructed from stainless steel sheets. The flexible member 42 can be rigid in response to torsional forces while remaining flexible in response to axial forces.

The coupling 30 includes a bearing system 48 attached to the flexible member 42 opposite the drive adapter 34. The bearing system 48 supports the coupling 30 via a bearing support 50. The bearing support 50 can be attached to a centerbody 52 of the case 20. The bearing system 48 includes a duplex bearing 54. The duplex bearing 54 is configured to dampen rotational whirl.

A spline interface 56 is mounted between the duplex bearing 54 and a drive shaft 58 of the auxiliary unit 18. The use of the bearing system 48 allows for the drive shaft 58 of the auxiliary unit to be relatively rigid.

A technical advantage of the disclosed nose cone spinner/power takeoff can include that the engine remains BOM with the addition of the power take-off shaft.

Another technical advantage of the disclosed nose cone spinner/power takeoff can include the power take-off shaft becomes interchangeable with no need for a recertification of the engine.

Another technical advantage of the disclosed nose cone spinner/power takeoff can include powering an auxiliary unit via the low spool.

Another technical advantage of the disclosed nose cone spinner/power takeoff can include the capacity to significantly increase the electrical power to an aircraft with minimal redesign.

There has been provided a coupling for a fan hub. While the coupling for a fan hub has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A coupling for a fan hub comprising:
    an auxiliary unit attached to the coupling;
    the fan hub attached to the coupling opposite the auxiliary unit, wherein the coupling is configured to translate rotary motion along an axis from the fan hub to the auxiliary unit to provide rotational power from a gas turbine engine to the auxiliary unit, wherein the coupling comprises a drive adapter having a coupling bolt pattern for attaching to the fan hub; wherein the coupling comprises a flexible member attached to the drive adapter.

2. The coupling for a fan hub according to claim 1, wherein the fan hub supports fan blades.

3. The coupling for a fan hub according to claim 1, wherein the auxiliary unit is selected from the group consisting of an electrical generator, a hydraulic pump and an airframe mounted accessory drive.

4. The coupling for a fan hub according to claim 1, wherein the flexible member comprises laminated sheets located on opposite sides of a central shaft.

5. The coupling for a fan hub according to claim 1, wherein the coupling comprises a bearing system attached to the flexible member opposite the drive adapter.

6. A gas turbine engine coupling for a fan hub power takeoff comprising:
    a fan located at a forward portion of the gas turbine engine, the fan comprising the fan hub supporting fan blades;
    a casing attached forward of the fan proximate the forward portion of the gas turbine engine;
    an auxiliary unit mounted in the casing;

a coupling operatively coupled between the fan hub and the auxiliary unit, wherein the coupling is configured to translate rotary motion along an axis from the fan hub to the auxiliary unit to provide rotational power from the gas turbine engine to the auxiliary unit, wherein the coupling comprises a drive adapter having a coupling bolt pattern for attaching to a fan hub flange bolt pattern to secure the drive adapter to the fan hub, wherein the coupling comprises a flexible member attached to the drive adapter configured to dampen misalignment between the fan hub and the auxiliary unit.

7. The gas turbine engine coupling for a fan hub power takeoff according to claim 6, wherein the flexible member comprises laminated sheets located on opposite sides of a central shaft.

8. The gas turbine engine coupling for a fan hub power takeoff according to claim 6, wherein the coupling comprises a bearing system attached to the flexible member opposite the drive adapter, the bearing system comprising a duplex bearing.

9. The gas turbine engine coupling for a fan hub power takeoff according to claim 7, wherein the coupling comprises a spline interface mounted between the duplex bearing and a drive shaft of the auxiliary unit.

10. A process for employing a gas turbine engine coupling for a fan hub power takeoff comprising:
locating a fan at a forward portion of the gas turbine engine, the fan comprising the fan hub supporting fan blades;
attaching a casing forward of the fan proximate the forward portion of the gas turbine engine;
mounting an auxiliary unit in the casing;
attaching a coupling between the fan hub and the auxiliary unit;
attaching the coupling to the fan hub employing a drive adapter having a coupling bolt pattern configured to match a bolt pattern of a fan hub flange bolt pattern to secure the drive adapter to the fan hub;
attaching a flexible member to the drive adapter; and
dampening misalignment between the fan hub and the auxiliary unit employing the flexible member; and
translating rotary motion along an axis from the fan hub to the auxiliary unit to provide rotational power from the gas turbine engine to the auxiliary unit.

11. The process of claim 10, further comprising:
attaching a bearing system to the flexible member opposite the drive adapter, the bearing system comprising a duplex bearing; and
dampening rotational whirl with the duplex bearing.

12. The process of claim 11, further comprising:
mounting a spline interface between the duplex bearing and a drive shaft of the auxiliary unit.

13. The process of claim 11, further comprising:
supporting the bearing system with a bearing support attached to a centerbody of the casing.

14. The process of claim 10, wherein the auxiliary unit is selected from the group consisting of an electrical generator, a hydraulic pump and an airframe mounted accessory drive.

* * * * *